July 9, 1968  L. WESCH  3,392,384
DETECTION PROCESS AND APPARATUS
Filed Oct. 21, 1960  3 Sheets-Sheet 1

July 9, 1968 L. WESCH 3,392,384
DETECTION PROCESS AND APPARATUS
Filed Oct. 21, 1960 3 Sheets-Sheet 2
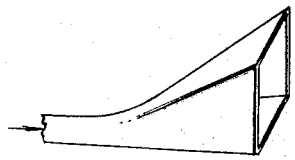
Fig. 5
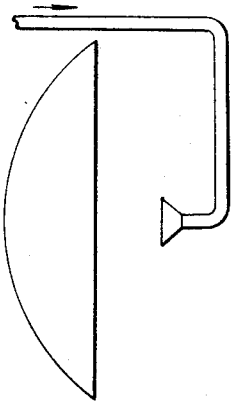
Fig. 6
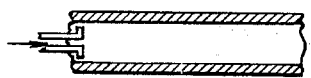
Fig. 7
 
Fig. 7a  Fig. 7b
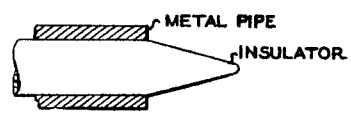
METAL PIPE
INSULATOR
Fig. 8
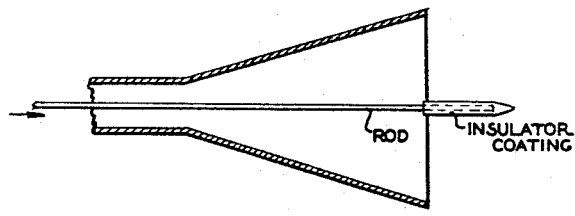
ROD  INSULATOR COATING
Fig. 9
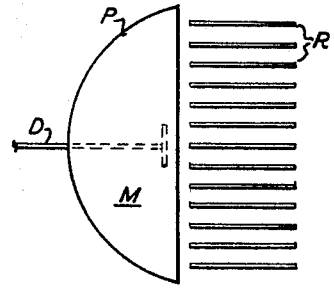
Fig. 10
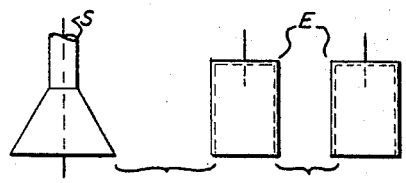
Fig. 11
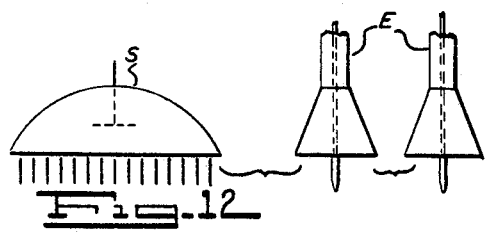
Fig. 12

July 9, 1968  L. WESCH  3,392,384
DETECTION PROCESS AND APPARATUS
Filed Oct. 21, 1960  3 Sheets-Sheet 3

United States Patent Office 3,392,384
Patented July 9, 1968

3,392,384
DETECTION PROCESS AND APPARATUS
Ludwig Wesch, Heidelberg, Germany, assignor to Eltro G.m.b.H. & Co., Gesellschaft fur Strahlungstechnik, Heidelberg, Germany
Filed Oct. 21, 1960, Ser. No. 64,204
Claims priority, application Germany, Oct. 23, 1959, E 18,395
9 Claims. (Cl. 343—5)

This invention relates to a process and apparatus for detecting hidden objects by means of electromagnetic waves.

Known processes for detecting metallic objects in the ground generally employ electromagnetic detecting coils connected to high-frequency transmitters. It is, however, extremely difficult to detect non-metallic objects with this type of apparatus even if said non-metallic objects contain small amounts of metals or metallic powders.

Various attempts have been made to use the reflection of electromagnetic waves for detecting non-metallic objects. For this purpose, a physical phenomenon is used, according to which reflection of the waves takes place wherever there is a discontinuity of dielectric constant. However, detection in this manner involves a substantial disadvantage to the effect that electromagnetic waves are reflected both at the surface of the body or medium to be inspected and from the interior of the medium in which the dielectric break is located.

It is possible to bunch or focus electromagnetic waves used for detection and to use, for the purpose of better focusing, very short waves and especially waves in the range of from 50 cm. to 1 mm. However, such a process is not suited in practice for detecting dielectric bodies in the ground, especially if the water content of the ground fluctuates.

Owing to the varying water content of the ground and to the varying composition of the ground, the latter shows fluctuations in dielectric constant which are at least in the range from 4 to 40. The surface reflection of surface waves thereby fluctuates substantially, and for each dielectric constant an instrument operating according to the above-described process would have to be newly calibrated or adjusted.

In addition, it is known that the reflection of surface waves causes up to about 80% of the radiated energy to return to the associated receiving device and that the energy originating in the body or ground is below about 10% of this energy and even below 1%. Thus, known processes do not permit a sensitive detection of radiation originating in the ground or from any other such medium or to effect detection under specially difficult surveying conditions.

According to the invention, the above disadvantages can be overcome and a very sensitive, automatically operating instrument can be obtained if the following process and the below-described devices are used.

Briefly, an antenna system is used which radiates over a relatively large area and is connected to twin receiving systems of any conventional type which are modified, however, according to the invention, for being alternately switched into a comparison device in such a manner that a compensation of the surface reflected waves is obtained whereby only the radiation coming from within the ground is detected. The control eliminating the surface waves may be effected mechanically and/or electrically. In addition, one of the receiving systems can be controlled by a degenerative or negative feedback in such a manner that an automatic compensation of all received signals is maintained in the instrument and such that the signal or object to be detected is indicated by the size of the feedback.

The process according to the invention will next be explained by way of example with reference to the accompanying drawing in which:

FIG. 1 diagrammatically illustrates the physical layout of the apparatus of the invention;

FIG. 2 diagrammatically illustrates the application of a detector to reflected electromagnetic waves;

FIGS. 5–10 illustrate known types of antennae suitable for use in FIG. 1;

Figure 1:
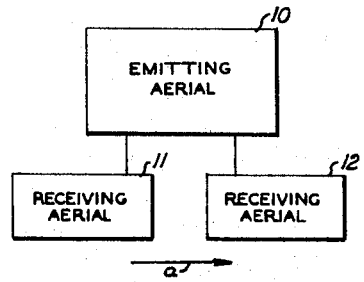

FIGS. 11–14 diagrammatically represent antennae arrangements for FIG. 1; and

Figure 3:
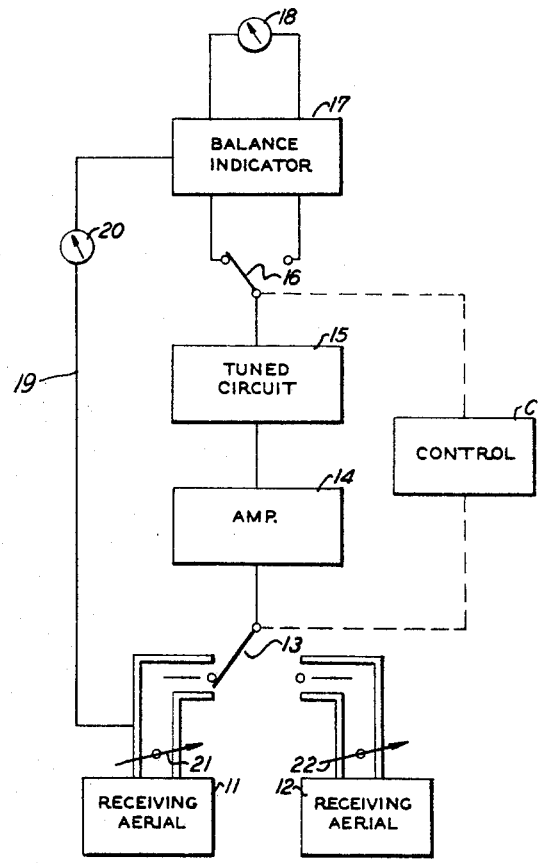
FIG. 3 is a block diagram of the electrical circuit of the invention.
Figure 15:
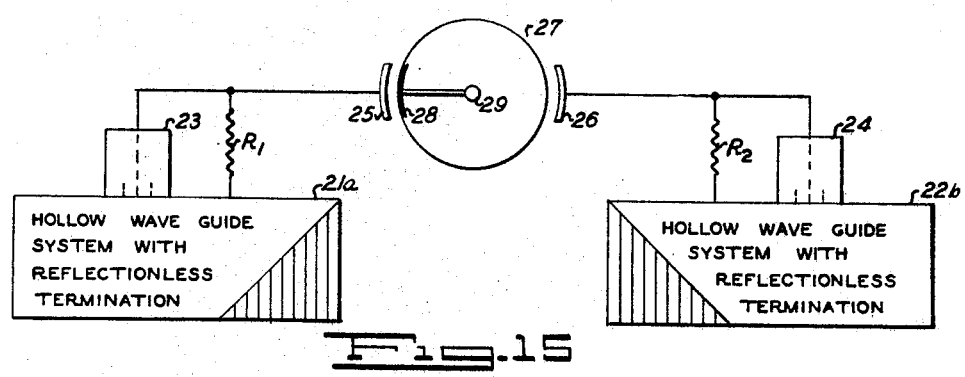
Figure 16:
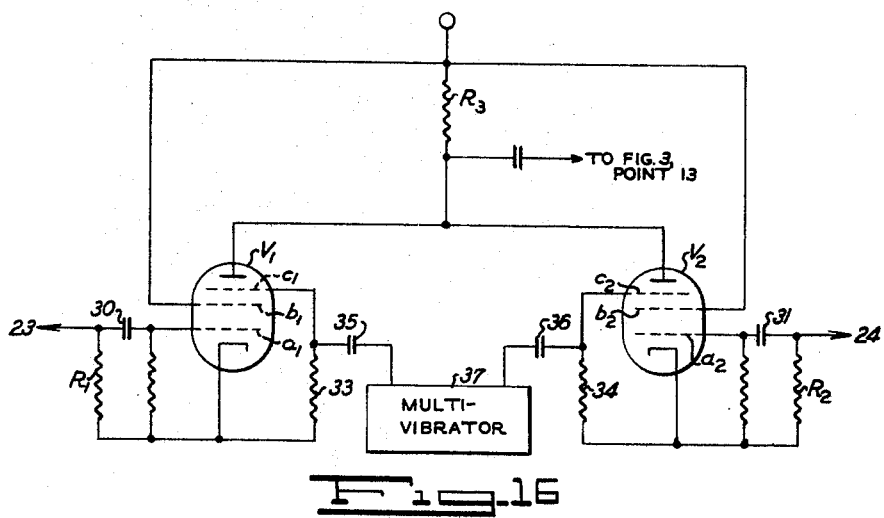

FIGS. 15 and 16 illustrate switch arrangements for use in FIG. 3.

Figure 2:
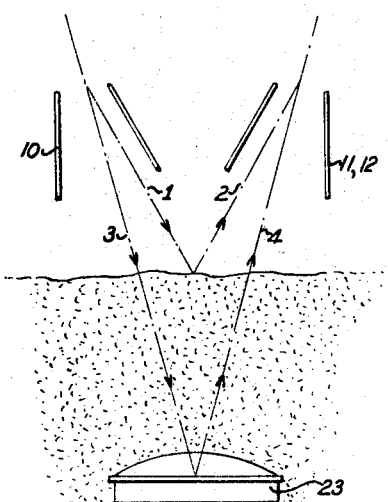

Referring now to FIG. 1, a dielectric body is detected, for example, by the use of a transmitting aerial, which radiates over a relatively large area. Within said area, which should be uniformly exposed to the transmitting antenna, are two sequential or adjacent receiving aerials or wave collectors 11 and 12. Said receiving aerials form with the emitting aerial 10, according to FIG. 2, an angle which can be adjusted, so that objects positioned at different depths can be located accurately. These elements, once the angle is selected, however, preferably form a relatively fixed assemblage.

FIGS. 5–10 illustrate known antenna systems suitable for use in the present invention. FIG. 5 illustrates a rectangular or square (or possibly circular) radiating horn with an aperture angle of about 30°. FIG. 6 shows a small parabolic radiator with a frontal energy supply but also possible with rearward feed. FIG. 7 illustrates a dielectric hollow guide radiator with a circular (FIG. 7a) or square (FIG. 7b) section. FIG. 8 shows a dielectric rod radiator which can be round or rectangular in section. FIG. 9 shows a Goubeau radiator with an internal metal wire or rod and external insulation. FIG. 10 shows a brush radiator consisting of a parabolic reflector P, a dipole feed D, a dielectric medium M, having the characteristics $$\tan \delta_d = 0.01, \ k < 10$$

wherein $\delta_d$=dielectric loss fractor
and $k$=relative dielectric constant and rods R of at least 10 to the square centimeter with a cross section of less than 1 mm.

FIGS. 11–14 illustrate antenna combinations according to FIG. 1, wherein the transmitter antenna 10 is designated S and the two receiver antennae 11 and 12 are designated E. It is obvious that all antenna-types referred to above are mutually interchangeable, and it is necessary only that the two antennae 11 and 12 of the receiving system be identical.

The process of the invention consists in that the surface wave 1, 2 (shown in FIG. 2) is compensated automatically in the two receiving systems and that the instrument thus only has to detect the waves 3, 4 arriving from within the ground and reflected by the object 23 to be detected. The compensation is effected according to the diagram shown in FIG. 3.

The antennae or aerials 11 and 12 are connected to a switch 13 which alternately connects the antenna system 11 or the antenna system 12 to the subsequent circuit.

Following the switch 13 is an amplifier 14 and a tuned circuit or resonant amplifier 15. The tuned circuit 15 is connected to a switch 16 which operates synchronously with the switch 13. The switch 16 and the sequentially connected element or balance indicator 17 form a phase detector in which signals arriving from antennae 11 and 12 are compared and rectified.

As soon as the signals arriving from 11 and 12 are of equal magnitude, the measuring instrument 18 shows no deflection, since the amplitudes of the signal cancel each other. As soon as there is a deviation of the amplitude of the signals from antennae 11 or 12, one of the signals (that originating at antenna 11 is illustrated) is adjusted by way of a negative feedback line 19, so that the measuring instrument 18 is restored to zero or some equivalent setting. The magnitude of the feedback is indicated by the measuring instrument 20 and provides a reading which serves as a highly sensitive indication of the reflection wave from the medium in which the dielectric object is present. This reflection wave must be considered an interference wave originating at the dielectric separation of the medium and which interferes as such with the compensation of the surface wave.

The use of the timed circuit or resonance amplifier and the negative feedback permit not only to balance all variations of the entire system, but also to adjust the detection with the highest possible sensitivity.

For purposes of a detection operation, the apparatus according to FIG. 1 is set over a metallic plate or any homogeneous dielectric so that the two signals received by elements 11 and 12 are completely equal and so that the measuring instrument 18 is at zero. An adjustment can be effected by attenuators 21 and 22 of FIG. 3 or by the control of an intermediate amplifier which may be a receiving diode located between elements 11 and 13 or 12 and 13, or between elements 23 and 25 or 24 and 26 of FIG. 15.

The arrangement according to FIG. 1 is then moved over the ground in the manner indicated by arrow $a$. As soon as the antenna system 11, by way of example, reaches a region in which a foreign dielectric is contained in another rather homogeneous dielectric, the antenna system 11 will supply a signal different from that of antenna system 12, while the antenna system 12 still receives the same reflected radiation and supplies the same signal as before.

Since the surface in the inspected area has a substantially invariable dielectric constant and it can be assumed that reflection conditions at the surface remain substantially constant, the surface wave will continue to remain compensated, while the reflected radiation from the ground releases an additional signal via element 11. Interference between a strong surface wave and a weak signal from the ground scarcely influences the conditions.

Even if the surface wave is not fully compensated owing to inhomogeneities, the signal coming from the ground can still be better detected than by the previously known processes. By adjustment of the arrangement according to FIG. 1 (bunching of all antennae systems and position of same) it is possible to select the depth within which detection is to be effected.

It is moreover advisable not to put the receiving antenna systems 11 and 12 too far apart, since allowance must be made for the possibility that the surface of the ground actually does have minor changes. It has been determined that a distance between the two antenna systems of the order of magnitude between 10 and 50 centimeters is sufficient for an accurate detecting operation.

If very small surface areas are to be examined and a highly accurate detection is required, it is preferred, according to the invention, to employ extremely short waves, since the same permit a very sharp bunching or focusing and since the receiving antennae for these wavelengths can readily be produced with excellent directional patterns and with an aperture angle of, for example, less than 1°. In this case, the arrangement should operate in the range from 5 cm. to 1 mm., and it is advisable to operate mainly with the 8 mm. wave. This has the additional advantage that, owing to dispersion, the dielectric constant of water drops substantially in this wavelength range and that moisture in the ground is less perceptible than in the case of long waves.

The switches 13 and 16 in FIG. 3 operate synchronously and may be actuated either mechanically or electrically by use of a conventional control C. For a mechanical construction, for example, when using waveguide system, the switch may consist of two attenuating discs, which are jointly mounted on a shaft, said attenuating discs being reversed through 180°. Upon rotation of the attenuating discs, the same dip alternately into the system 11 or 12 and thereby block alternately elements 11 or 12.

The switch 13 diagrammatically indicated in FIG. 3 can be capacitive as in FIG. 15 or electric as in FIG. 16.

In FIG. 15, elements 21a and 22b constitute a hollow wave guide system corresponding to elements 11 and 12 of FIGS. 1 and 3 with reflectionless termination. Elements 23 and 24 are diodes terminated with their own resistances R1 and R2. Elements 25 and 26, together with a conductive coating 28 on a rotating disc 27, constitute a condenser and transmit to conductor 29 and to the amplifier 14 of FIG. 3 the alternating current appearing at the resistances R1 and R2.

FIG. 16 illustrates condensers 30 and 31 and resistances R1 and R2 for diodes 23 and 24 constituting the input to tubes V1 and V2. The signals thus appear simultaneously at the grids of tubes V1 and V2. These tubes have multiple grids A1, B1 and C1 and A2, B2 and C2. The grids C1 and C2 are blocking grids to the circuit of which a multivibrator 37 is connected through resistor 33 and capacitor 35 and through resistor 34 and capacitor 36. This multivibrator simultaneously unblocks grid C1 and blocks grid C2 or vice versa thereby achieving alternate switching of the signals. The switch disc 27 of FIG. 15 is mounted on the same shaft as the switch 16 of FIG. 3. If use is made of an electronic switch according to FIG. 16 then the switch 16 of FIG. 3 is also a similar electronic switch.

Figure 4:
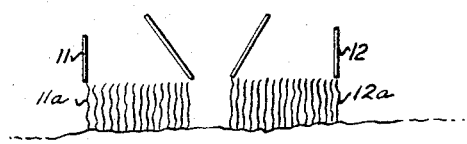
FIG. 4 illustrates a detail which may be employed for improved results.
Figure 14:
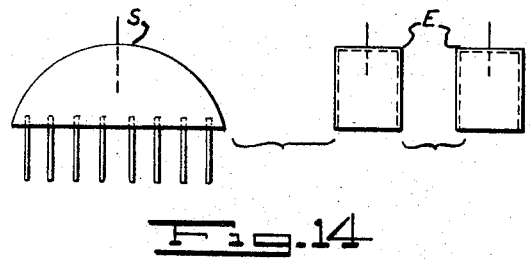
Figure 13:
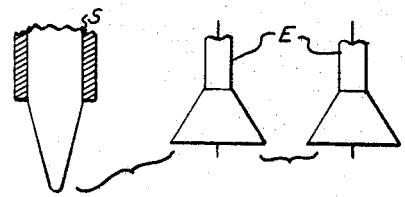

Since surface waves always differ extremely as to their energy in comparison with the waves coming out of the ground, it has been found advisable for a very sensitive detection to use special antenna systems which are not freely radiating, but which permit guiding the high-frequency waves directly to the ground. For this purpose, it is advantageous to use arrangements, for example, according to FIG. 4, in which one or more wires project from the receiving funnel of antennae 11 and 12, which are surrounded with a dielectric and which guide the waves in the form of wire waves directly to the ground. Such waves are known per se in the form of Goubeau waves described by Meinke/Gundlach "Taschenbuch der Hochfrequenztechik" (Pocket Book of High Frequency Technique). Springer 1956, page 245.

However, there is still another possibility of matching the characteristic impedance of the ground with the iterative impedance of the antenna system and to bridge the iterative impedance of the free space between the antenna system and ground. According to the invention, this is done most advantageously by using dielectrics of different conductivity which are coupled to the antenna system in the form of filaments 11a and 12a of FIG. 4 or are portable rod antennae or tubular antennae of a type known per se which loosely touch the ground. In the antenna M illustrated in FIG. 10, the rods or filaments R extend into the dielectric in which the electromagnetic field formed by antenna elements P and D is concentrated. The rods or filaments R are capacitively excited by antenna element D, particularly if there is a dielectric body between antenna elements D and the inside of element P. In addition to the above, there may be excitation in the radiation field. These rods can also consist of filaments of loss-free dielectric material such as polyethylene, polybutadiene, acrylonitrile, soft polystyrols and the like. In order not to cause any further points of wave impact on the filaments themselves and on the ground, it is advisable to make these filaments over their length variable as to their resistance or their conductivity, so that, in the manner of an exponential line, the characteristic impedance of the system 11 can be matched to the mean characteristic impedance of the ground. The adjustment of the impedances is obtained by providing a graphite or carbon filling for the dielectric material. A filling of 10 to 30% by weight of graphite or carbon or a mixture of 2 to 1 of these substances is advantageous. Further matching to ground can be obtained by varying the thickness of the filament throughout its length. With an average thickness of 1 mm. in the system the filament at ground level should reach a thickness of 2 to 3 mm. With thinner filaments this ratio should be maintained. In spite of the two above-described possibilities, a residual reflection will, as a rule, remain at the ground; but the process according to the invention permits to balance this residual reflection considerably better than the direct irradiation of the medium or the ground.

The process and the apparatus of the invention produce a substantial technical advantage in detecting non-conducting or only weakly conducting objects buried in the ground to a depth of 1 in. and up to 10 ins. The process and apparatus permit, for example, to detect wood or wooden cases which are buried in the ground and, in addition, articles of synthetic substances (plastics) and, in this connection, mines, which have plastic covers.

Whereas the apparatus has been described hitherto for single frequency operation or amplitude modulation, it is also possible to operate with frequency modulation. In this form it is necessary according to known methods disclosed by Meinke/Gundlach to modulate the transmitter frequency up to one octave. The frequency variation is governed necessarily by the band width of the receiver and transmitter. Each frequency modulation introduces a reduction of the standing wave which always exists between the ground surface and the detecting apparatus. Thus it is possible to achieve a clear signal up to one meter above ground surface.

What is claimed is:

1. Apparatus for detecting an object having a first dielectric constant located in a body having a second dielectric constant and including a surface portion; said apparatus comprising a transmitting antenna system displaceable over the surface portion of said body and adapted to radiate over said body electromagnetic microwaves reflectable by dielectric media, spaced receiving systems operatively associated with said transmitting system and displaceable with the same to receive reflected microwaves for detecting said object, and means coupled to said receiving systems for comparing the reflected microwaves received by said receiving systems whereby the microwaves reflected by said surface portion, being substantially equal, are cancelled out and the microwaves reflected by said object being first received by one of the receiving systems, create an imbalance indicating the detection of said object, said apparatus further comprising means in at least one of said receiving systems to adjust the same for an initial balance.

2. Apparatus for detecting an object having a first dielectric constant located in a body having a second dielectric constant and including a surface portion; said apparatus comprising a transmitting antenna system displaceable over the surface portion of said body and adapted to radiate over said body electromagnetic microwaves reflectable by dielectric media, spaced receiving systems operatively associated with said transmitting system and displaceable with the same to receive reflected microwaves for detecting said object, and means coupled to said receiving systems for comparing the reflected microwaves received by said receiving systems whereby the microwaves reflected by said surface, being substantially equal, are cancelled out and the microwaves reflected by said object being first received by one of said receiving systems, create an imbalance indicating the detection of said object, said means including a switch arrangement and a balance indicator connected by said switch arrangement alternately to said receiving systems.

3. Apparatus as claimed in claim 2 comprising feedback means coupling said balance indicator to one of said receiving systems for restoring a balance in said balance indicator and a meter operatively associated with said feedback means to measure the feedback and thus the magnitude of the imbalance.

4. Apparatus as claimed in claim 3, wherein the feedback means is a negative feedback circuit.

5. Apparatus as claimed in claim 2, wherein the switch arrangement is electro-mechanical.

6. Apparatus as claimed in claim 2, wherein the switch arrangement is electronic.

7. Apparatus for detecting an object having a first dielectric constant located in a body having a second dielectric constant and including a surface portion; said apparatus comprising a transmitting antenna system displaceable over the surface portion of said body and adapted to radiate over said body electromagnetic microwaves reflectable by dielectric media, spaced receiving systems operatively associated with said transmitting system and displaceable with the same to receive reflected microwaves for detecting said object, and means coupled to said receiving systems for comparing the reflected waves received by said receiving systems whereby the microwaves reflected by said surface, being substantially equal, are cancelled out and the microwaves reflected by said object being first received by one of said receiving systems, create an imbalance indicating the detection of said object, said apparatus further comprising receiving antenna means connected to each of said receiving systems and at least one dielectric thread extending from each said receiving antenna means and adapted to contact said body.

8. Apparatus for detecting an object having a first dielectric constant located in a body having a second dielectric constant and including a surface portion; said apparatus comprising a transmitting antenna system displaceable over the surface portion of said body and adapted to radiate over said body electromagnetic microwaves reflectable by dielectric media, spaced receiving systems operatively associated with said transmitting system and displaceable with the same to receive reflected microwaves for detecting said object, and means coupled to the receiving systems for comparing the reflected microwaves received by said receiving systems whereby the microwaves reflected by said surface, being substantially equal, are cancelled out and the microwaves reflected by said object being first received by one of said receiving systems, create an imbalance indicating the detection of said object, said apparatus further comprising means to bridge the iterative impedances of said receiving systems and body.

9. Apparatus for detecting an object having a first dielectric constant located in a body having a second dielectric constant and including a surface portion; said apparatus comprising a transmitting antenna system displaceable over the surface portion of said body and adapted to radiate over said body electromagnetic microwaves reflectable by dielectric media, spaced receiving systems operatively associated with said transmitting system and displaceable with the same to receive reflected microwaves for detecting said object, and means coupled to said receiving systems for comparing the reflected microwaves received by the receiving systems whereby the microwaves reflected by the surface, being substantially equal, are cancelled out and the microwaves reflected by said object being first received by one of said receiving systems, create an imbalance indicating the detection of said object, said receiving systems and transmitting system being in mutually adjustable relative positions.

References Cited

UNITED STATES PATENTS

| | | | |
|---|---|---|---|
| 2,999,979 | 9/1961 | Woll | 324—3 |
| 1,812,392 | 6/1931 | Zuschlag | 324—3 X |
| 2,066,135 | 12/1936 | Barret et al. | 324—3 |
| 2,066,561 | 1/1937 | Fisher | 324—3 |
| 2,160,356 | 5/1939 | Fore et al. | 324—3 |
| 2,201,256 | 5/1940 | Barret | 324—3 |
| 2,415,089 | 2/1947 | Feldman | 343—785 |
| 2,623,924 | 12/1952 | Cartier et al. | 324—4 |
| 2,642,477 | 6/1953 | Puranen et al. | 324—6 |
| 2,909,725 | 10/1959 | Bell | 324—5 |
| 2,931,973 | 4/1960 | Puranen | 324—6 |

RODNEY D. BENNETT, *Primary Examiner.*

CHESTER L. JUSTUS, KATHLEEN H. CLAFFY, *Examiners.*

D. MEXIC, P. M. HINDERSTEIN, C. L. WHITHAM, *Assistant Examiners.*